Aug. 14, 1951     A. M. GUERY     2,564,530
MOTOR INSTALLATION FOR AIRCRAFT
Filed Nov. 12, 1947     2 Sheets—Sheet 1
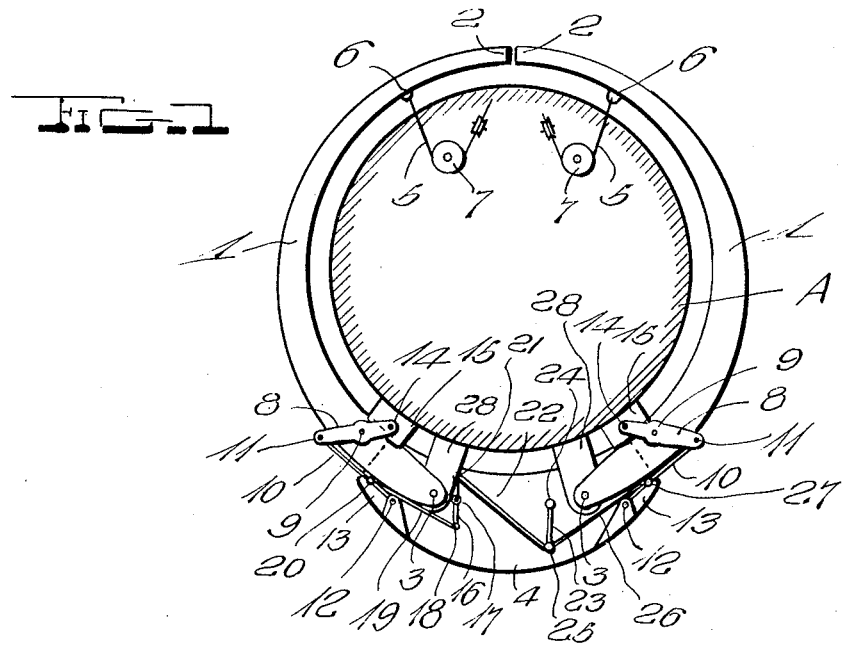
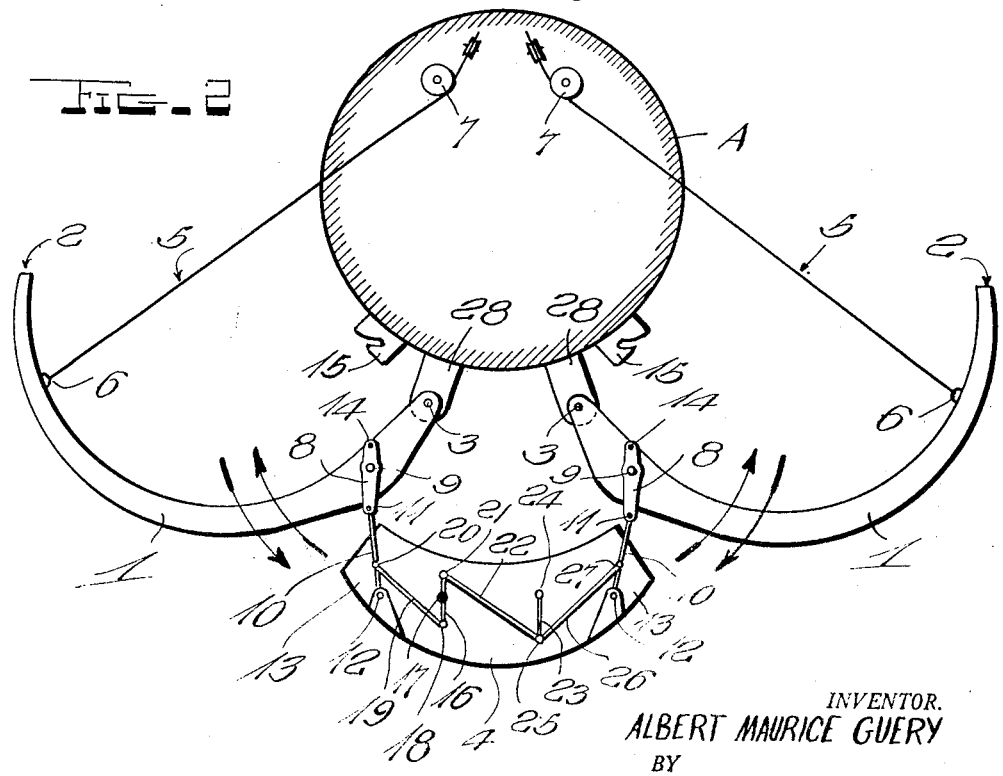
INVENTOR.
ALBERT MAURICE GUERY
BY
Linton and Linton
ATTORNEYS

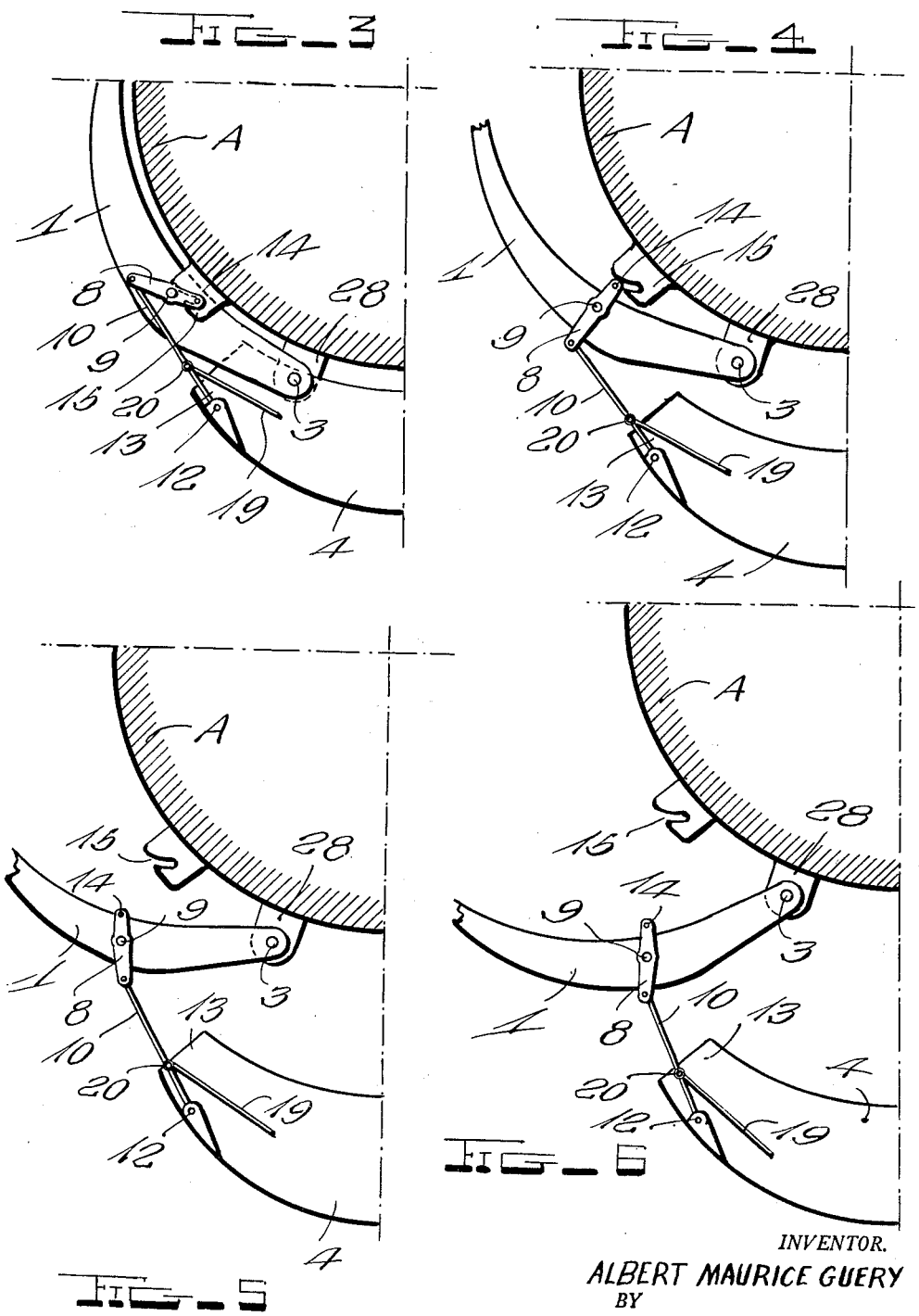

Patented Aug. 14, 1951

2,564,530

UNITED STATES PATENT OFFICE 2,564,530

MOTOR INSTALLATION FOR AIRCRAFT

Albert Maurice Guery, Paris, France, assignor to Societe dite: Societe Nationale d'Etude et de Construction de Moteurs d'Aviation, Paris, France, a French company Application November 12, 1947, Serial No. 785,382
In France November 14, 1946

5 Claims. (Cl. 123—41.7)

Each motor of an aircraft is lodged in a cowl, which has for its double aim to canalize the cooling air for the said motor and to reduce to a minimum the air resistance.

This cowl, of aerodynamic shape, covers up the motor closely. Hitherto it has been formed of pieces rigidly assembled so that the motor can only be attended to after carrying out preliminary operations. On the other hand, the necessities of flight, of upkeep and of repairs demand the complete and instantaneous accessibility of the said motor.

An object of the present invention is to provide means which permit of instantaneous and complete accessibility of a motor of an aircraft. A further object of the invention is to provide means whereby complete disengagement of the cowl is not necessary and whereby one, at least, of the elements forming the cowl may be used as a working platform for the personnel charged with attending to the motor, its upkeep and repair.

According to the present invention a motor installation for an aircraft includes, in combination, a motor, a cowl enshrouding the said motor, the said cowl consisting of juxtaposed peripheral elements or panels, means for displacing, at least, one of the said elements or panels from the position in which it enshrouds one part of the motor into another position in which it disenshrouds the said part of the motor and it can be instantaneously used as a working platform, means for maintaining the said element in the said working position with the personnel thereon charged with the attendance, the upkeep and the repair of the said motor and the material necessary therefor and means for replacing the said element or panel into its original position.

Numerous arrangements of the motor of an aircraft can be provided in accordance with the principle above defined. Among these may be mentioned by way of example those in which the cowl comprises:

Two lateral panels, of which each is of a size sufficient to afford access to one of the sides of the motor and of which the longitudinal section has the profile or contour of a usual motor cowl, each of these panels being mounted pivotally on an axis adjacent to its lower edge and parallel to the longitudinal axis of the motor, and being, preferably, arranged at the same height relative to the motor.

A lower panel arranged below and between these lateral panels, and in contact with them in the closed position of the cowl, this lower panel being suspended from the said lateral panels, movable parallel to itself and serving as closing device for the cowl at its lower part.

The mechanical strength of each of these panels is sufficient to support the weight of the personnel together with the materials necessary for examination, maintenance and repair of the part of the motor situated opposite this panel, when the latter is in its closed position.

Each of the lateral panels is provided with means for holding it in the top closed position, in the lower open position, wherein it is adapted to serve as a working platform, and means for both raising and lowering it.

In the case of a radial cylinder motor, the installation can comprise, for example, a cowl of circular cross section, and formed solely of three panels, namely: two symmetrical side panels having each the shape of a shell and meeting at their upper ends when in their closed position, and one lower panel in contact with the lower ends of the two side panels at its extreme longitudinal edges. This lower panel can, in addition, be constructed in the form of an air sleeve.

The invention will be further described by reference to the accompanying schematic drawings of a radial cylinder motor installation constructed in accordance with the principles above defined with a cowl formed solely by three panels.

In the drawings:

Fig. 1 is a vertical section representing a radial motor with the present cowl mounted thereon and in its closed position;

Fig. 2 is similar to Fig. 1 but with the cowl in an open position;

Fig. 3 is an enlarged detail section of a portion of a side and bottom section of the cowl;

Fig. 4 is similar to Fig. 3 but with the members of the cowl as positioned at the beginning of the opening thereof;

Fig. 5 is similar to Fig. 3 but with the members of the cowl as positioned half way between the open and closed positions thereof; and Fig. 6 is a further enlarged detail section of a portion of the cowl with the members in their open position.

In Fig. 1, A is a circle representing conventionally the radial motor of the plan represented. The cowl which in the closed position completely surrounds the motor as shown in the figure is here formed by:

1. Two side panels 1—1 each of which is in the shape of a shell and in vertical section presents the shape of a circular arc. When the cowl is closed these two shells are in contact with one another at their upper edges 2—2. Each of these shells is mounted pivotally about an axis 3 situated at its lower part.

2. A lower panel 4 which, here, in addition, is constructed in the shape of an air sleeve. This panel is suspended from the lateral panels and closes the lower part of the cowling when in its closed position. In the perpendicular direction to that of the figure, that is to say following the axis of the motor each of these three elements, the two shells and the lower panel, has the usual radial engine cowling profile both externally and internally.

Each of the external shells is provided with the following elements:

(a) A device for maintaining said shell in the raised position or the lowered position where it forms a working platform. This device is here formed by a cable 5 fixed at its lower end 6 to the upper part of the said shell and passing over a guiding pulley 7.

(b) means for operating each of the said shells both for lowering and raising it. These means (not shown) may in actual practice consist of a drum for rolling up and unrolling the cable 5. This drum is rigidly connected to a similar drum of the working cable for the other shell and these two drums thus coupled together are driven simultaneously by any suitable device, a handle or motor for example.

(c) the arrangement for the suspension of the lower panel 4 from this shell comprises:

(α) a lever 8 pivotal about an axis 9 carried by the shell.

(β) a connecting rod 10 connected at 11 at its upper end to the lower end of said lever 8, and at its lower end 12 to the corresponding lateral extremity 13 of this lower panel 4.

The arrangement is completed:

(a) For each shell, by a roller 14 carried by the aforementioned suspension lever of the panel 4, this roller being mounted on the end of the lever 8 opposite to the connection 11, and cooperating with fixed catches 15 rigidly connected to the supporting axis of the pulleys 7.

(b) an apparatus giving to the lower panel 4 a vertical movement at the time of its ascent and descent during the simultaneous opening and closing of the shells.

Here the apparatus mounted on this same lower panel for comprises at one side thereof a lever 16 rotatable about an axle 17 carried by said lower panel, this lever being connected at its lower end 18 to a connecting rod 19 which is also connected at 20 to the lever 10 for suspension of the panel 4 and at its upper end 21 to a rod 22 connecting with the other elements of the arrangement situated at the other side of the panel 4. On this said other side of the panel a lever 23 is pivoted at 24 and its lower end carries a connection 25 for the connecting rod 22 and for a connecting rod 26 of which the opposite end is connected by a connection 27 to the lever 10 situated on this side.

The rollers 7 and the ramps 15 are formed on supports rigid with the motor, represented, here, in space solely occupied by the circle A. At the same time, the feet 28 for the support of the axes of rotation 3 of the shells 1—1 are carried by the motor.

Fig. 2 in which the elements 1—1 and 4 of the cowl are represented spaced from the motor in the open position of the elements of the cowl shows clearly that:

1. The whole motor is accessible from the fact of this spacing,

2. The internal face of each shell 1 as well as the internal face of the lower panel 4 can at once be used as working platforms for the maintenance personnel for upkeep and repair of the motor as well as of the material, plant, replacements, etc., necessary to the said personnel for the accomplishment of its task.

Thus no special equipment is necessary to afford access to the motor freed of its cowl. By means of the present invention, the need for such ancillary equipment is done away with, and all the time necessitated for the installation and removal of this ancillary equipment is gained.

As has been said, this type of motor plant is here given only by way of an example, as numerous other plants might be constructed in accordance with principle defined without passing beyond the scope of the invention and at the same time, the latter is not limited to radial motors and it should be understood that it is applicable to motor installations of any type.

At least, the present invention includes also any aircraft provided with a motor installation made in accordance with the principles above defined.

I declare that what I claim is:

1. An improvement in cowls for aircraft engines comprising a plurality of cowling segments for encasing the aircraft engine, means for pivoting each of said segments which are for encasing the top and sides of said engine from said engine, and means connecting said pivoting segments with the bottom segment of said cowling segments for raising and lowering the same upon respective movement of said pivoting segments to and from the engine.

2. An improvement in cowls for aircraft engines comprising a pair of cowling elements each for encasing an opposite side and top portion of said engine and pivotally connected at a lower end thereto, means for pivoting each of said elements to and from said engine, a lower cowling element for at times enclosing the bottom portion of the engine in conjunction with said pair of side elements, and means connecting said side elements and said lower element for raising and lowering said lower element on the pivoting of one of said side elements.

3. An improvement in cowls for aircraft engines comprising a pair of cowling elements each for encasing an opposite side and top portion of said engine and pivotally connected at a lower end thereto, means for pivoting each of said elements to and from said engine and capable of maintaining the same laterally extended from said engine when desired, a lower cowling element for at times enclosing the bottom portion of the engine in conjunction with said pair of cowling elements, a pair of rods each pivotally connected to one end of said lower cowling elements and one of said pair of cowling elements, and a linkage system carried by said lower element and connecting said rods for causing said lower element to move in parallel positions to and from the engine upon movement of either of said pair of elements.

4. An improvement in cowls for aircraft engines comprising a pair of arcuate shaped panels, means pivotally connecting the lower edge of each panel to an opposite side of the aircraft engine, means for pivoting each of said panels to and from said engine and capable of maintaining the same laterally extended from said engine when desired, a lower panel formed for extending across the lower edges of said arcuate panels, a pair of levers each pivotally mounted on one of said arcuate panels, a pair of connecting rods each pivotally connected to one of said levers at one end and the other end to an opposite end portion of said lower panel, and a linkage system carried by said lower panel and connecting said rods for causing said lower panel to move in parallel positions to and from said arcuate panels upon movement thereof.

5. An improvement in cowls for aircraft engines comprising a pair of panels formed for encasing the sides and top portion of the engine, means pivotally connecting the lower edge of each panel to an opposite side of the engine, means for pivoting each of said panels to and from said engine and capable of maintaining the same laterally extended from said engine when desired, a curved panel formed for extending across the lower edges of said pair of panels and enclosing the lower portion of the engine, a pair of levers each pivotally mounted on one of said pair of panels, a pair of rollers each carried on an end of one of said levers, a pair of catches connected to the motor and each capable of receiving one of said rollers therein for retaining said panels in a closed position, a pair of rods each connected to the opposite end of one of said levers and to an end portion of said curved panel, and means carried by said curved panel connecting said rods for causing said curved panel to move in parallel positions to and from said pair of panels upon movement thereof and at the same time move said rollers in and out of said catches.

ALBERT MAURICE GUERY.

REFERENCES CITED

The following references are of record in the file of this patent:

UNITED STATES PATENTS

| Number | Name | Date |
|---|---|---|
| 2,178,998 | Scott | Nov. 7, 1939 |

FOREIGN PATENTS

| Number | Country | Date |
|---|---|---|
| 356,160 | Germany | July 14, 1922 |